United States Patent
Ludington et al.

[15] 3,680,667
[45] Aug. 1, 1972

[54] BRAKING APPARATUS

[72] Inventors: Robert L. Ludington, 3419 Manitou Trail; Robert M. Holloway, 921 N. Roeske Trail, both of Michigan City, Ind. 46360

[22] Filed: March 15, 1971

[21] Appl. No.: 124,306

[52] U.S. Cl. ................................................188/198
[51] Int. Cl. .............................................F16d 65/62
[58] Field of Search...........................188/196–203

[56] References Cited

UNITED STATES PATENTS

| 2,646,141 | 7/1953 | Dorey | 188/200 X |
| 3,040,844 | 6/1962 | Holloway et al. | 188/200 |
| 3,119,470 | 1/1964 | Rauglas | 188/200 |

*Primary Examiner*—Duane A. Reger
*Attorney*—Ward, McElhannon, Brooks & Fitzpatrick

[57] ABSTRACT

Braking apparatus for use on a railway car including an air cylinder, a piston push rod carried by the air cylinder, a live lever pivotally connected to the piston push rod, first linkage means connected to the live lever and a first pair of brake shoes connected to the linkage means, a slack adjuster connected to the live lever, a center rod actuatable by the live lever, a dead fulcrum lever connected to the center rod, second linkage means connected to the dead fulcrum lever and a second pair of brake shoes connected to the second linkage means, a control rod actuatable by the live lever and an overtravel compensating device mounted on the control rod which is engaged by activating means extending from the slack adjuster.

8 Claims, 8 Drawing Figures

PATENTED AUG 1 1972 3,680,667

INVENTORS
ROBERT L. LUDINGTON
BY ROBERT M. HOLLOWAY

ATTORNEYS

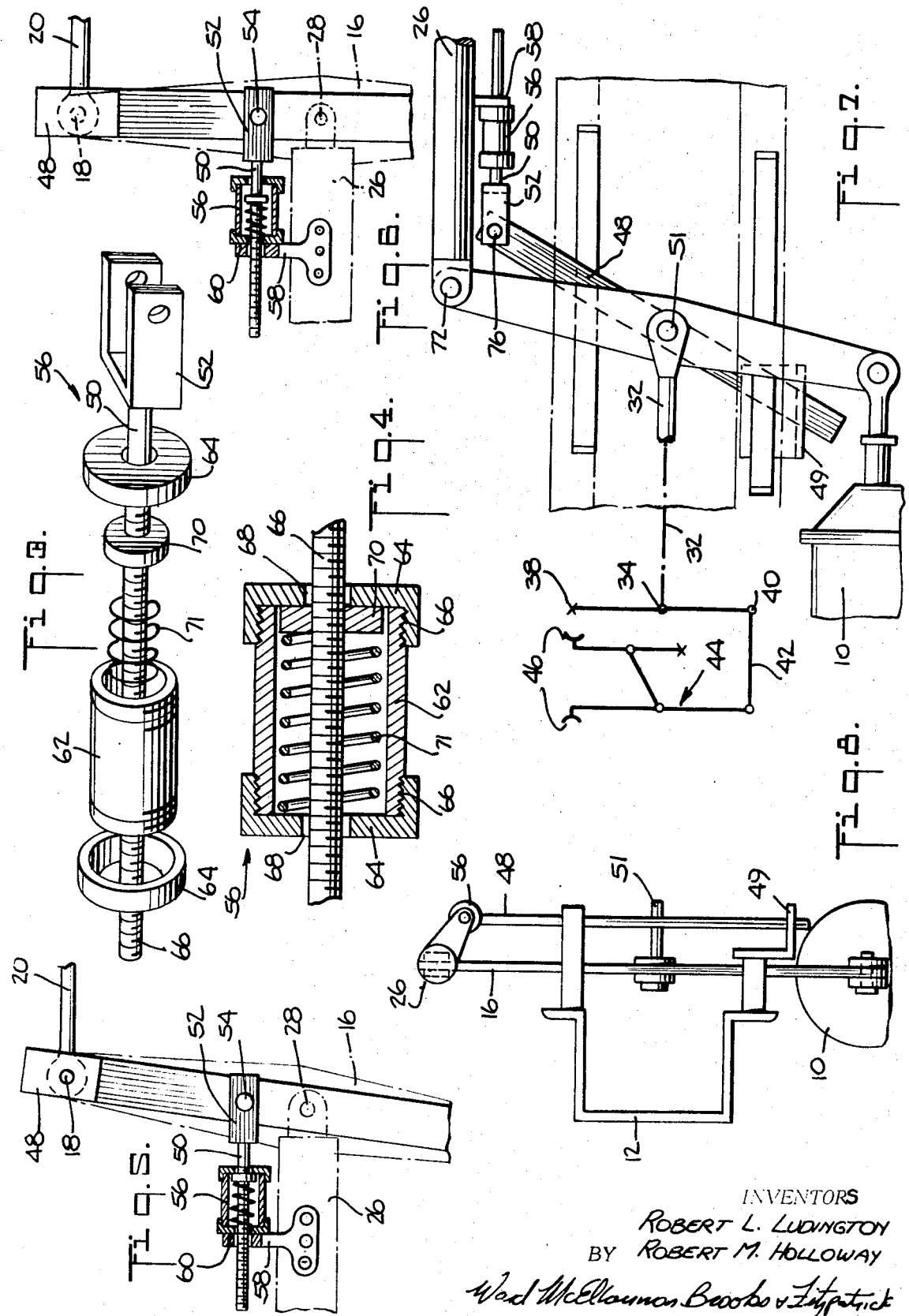

BRAKING APPARATUS

This invention relates to braking apparatus and more particularly to improvements in such apparatus. Among many other possible uses, braking systems according to this invention are particularly adapted for use on railway cars.

While many different types of braking systems have been employed heretofore, our contribution to the art is a new system which is an improvement over such prior art systems, as will become apparent as the description proceeds.

It has been found that it is desirable to protect the slack adjuster and the slack adjuster control rod, as mounted in railway braking systems, when they do not have enough overtravel built into them. By overtravel, it is meant the amount of movement that the slack adjuster and the control rod move into each other after the control rod has locked the slack adjuster.

In one form, our invention contemplates the provision of a new improved braking apparatus characterized by an air cylinder, a piston push rod carried by the air cylinder and a live lever pivotally connected to the piston push rod. First linkage means are connected to the live lever and a first pair of brake shoes are connected to the linkage means. A slack adjuster is connected to the live lever and a center rod is actuatable by the live lever. A dead fulcrum lever is connected to the center rod and second linkage means are connected to the dead fulcrum lever and a second pair of brake shoes is connected to the second linkage means. An overtravel compensating device is mounted on the control rod and activating means extend from the slack adjuster for engaging the overtravel compensating device. In one form of the invention, the overtravel compensating device includes a cylindrical member, a pair of end caps mounted on the ends of the member respectively, and a control rod extending through openings in the end caps. A spring retainer is fixedly mounted on the control rod within the cylindrical member and a spring is mounted on the control rod for acting between one of the end caps and the spring retainer.

There has thus been outlined rather broadly the more important features of the invention in order that the detailed description thereof that follows may be better understood, and in order that the present contribution to the art is better appreciated. There are, of course, additional features of the invention that will be disclosed more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 3 is an exploded, enlarged, perspective view of the overtravel compensating device;

FIG. 4 is an enlarged, medial, longitudinal, sectional view of the overtravel compensating device;

FIG. 5 is a fragmentary side elevational view of the overtravel compensating device in its extended position;

FIG. 6 is a fragmentary side elevational view of the travel compensating device of FIG. 5 shown in its retracted position;

FIG. 7 is a schematic plan view of a railway car braking system showing another embodiment of our invention, and FIG. 8 is an end view of the embodiment of FIG. 7.

Figure 1:
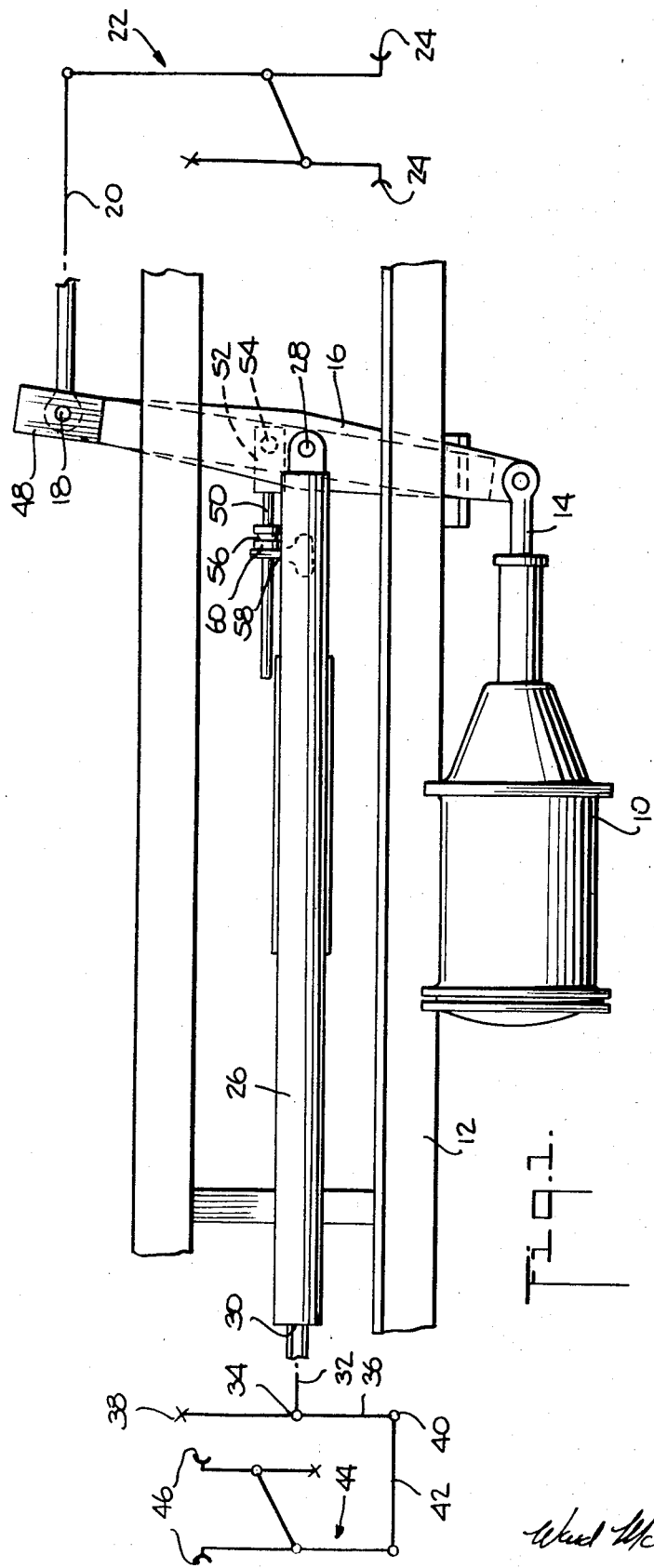
FIG. 1 is a schematic plan view of a railway car braking system constructed in accordance with the concept of this invention.
Figure 2:
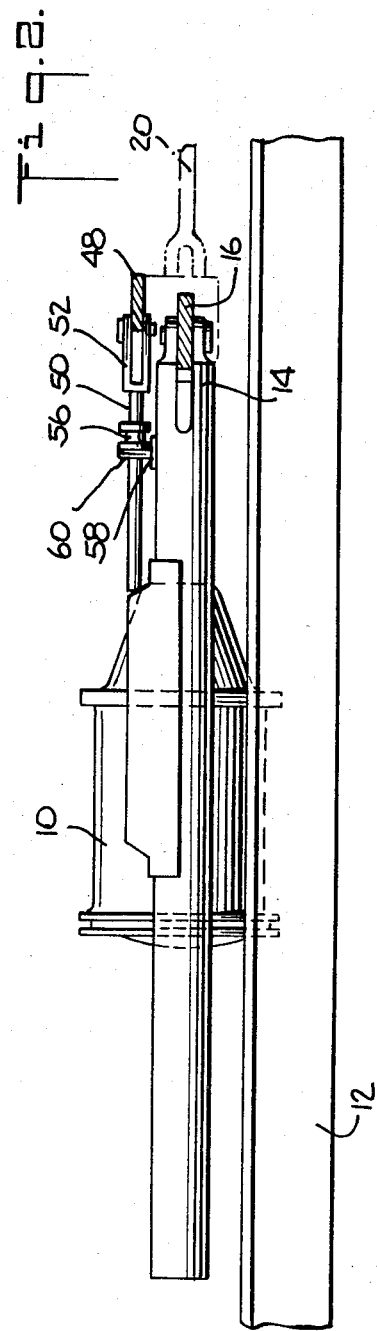
FIG. 2 is a fragmentary, elevational view of the braking system of FIG. 1.

In the embodiment of the invention illustrated in FIGS. 1–6, a brake or air cylinder 10, FIGS. 1 and 2, is mounted on a center sill 12 of a railway car. A piston push rod 14, FIG. 1, is operatively associated with a piston (not shown) which is mounted internally of the cylinder 10, said piston push rod 14 extending outwardly from the cylinder and the outer end thereof being pivotally connected to one end of a live lever 16 which extends transversely of the railway car and center sill 12. The other end of the live lever 16 is pivotally connected, as at 18, to one end of a pull rod 20 which is connected to a suitable linkage, indicated generally at 22. The linkage 22 is operationally connected to brake shoes 24 which are mounted to engage the periphery of the wheels, not shown, on one track of the railway car.

One end of a slack adjusting device 26 is pivotally connected, as at 28, FIG. 1, to an intermediate portion of the live lever 16 and the other end thereof is pivotally connected, as at 30, to a center rod 32 having its opposite extremity pivotally connected at 34 to an intermediate portion of a dead fulcrum lever 36 which has one end 38 mounted in fixed relation with respect to the car and has the other end thereof pivotally connected as at 40 to the pull rod 42. The pull rod is operatively connected to a linkage arrangement, indicated generally at 44, which is associated with braking shoes 46, which in turn engage the periphery of the wheels of a second truck (not shown) of the railway car.

An activating lever 48, FIG. 1, is pivotally connected at 18 to one end of the live lever 16, and a control rod 50 having a yoke 52 at one end is pivotally mounted on the activating lever 48, as at 54. An overtravel compensating device 56 is mounted on the control rod 50, and an activating arm 58 extends from the slack adjuster 26 for engaging the overtravel compensating device 56, as at 60, for causing operation of the slack adjusting device. When the brakes are released, the activating arm 58 and the overtravel compensating device 56 separate, and when the brakes are applied, movement of the activating arm 58, as a result of its engagement with the overtravel compensating device 56, operates the mechanism of the slack adjusting device 26 in such a manner as to lock and unlock the adjusting device at a predetermined time and to reduce the effective movement of the control rod when there is excessive slack in the brake rigging. Thus, when there is slack in the brake rigging the distance between the pivot point 28 (FIG. 1), and the pivot point 34 decreases during operation of the brakes. That is, most all commercially available slack adjusters achieve the same results, namely, when there is too much slack in the rigging, the adjusters remove this slack by shortening the overall length of the adjuster (distance between 28 and 34)

and if there is not enough slack in the rigging then the adjuster allows these two points to spread. However, there are different types of adjusters and they do this in various ways. One type of adjuster adjusts for this slack upon application and release of the brakes. Other adjusters measure the amount of slack in the rigging on application and then adjust for this slack upon release of the brakes. The overtravel safety device of the present invention is of particular benefit to the adjusters that measure on application of the brakes and then adjust on release of the brakes, because if excessive slack is in the rigging it is possible that during the measuring stroke if the control mechanism reaches its maximum stroke then the control rod could bend or something in the adjuster could break.

As best seen in FIGS. 3 and 4, the overtravel compensating device 56 includes a nipple 62 and a pair of end caps 64 which are threadably mounted on the ends of the nipple, as at 66. The control rod 50 has a threaded end portion 66 which extends through openings 68 in the end caps 64 and a lock nut 70 is mounted on the control rod within the nipple 62. A spring 71 is mounted on the control within the nipple 62. A spring 71 is mounted on the control rod 50 which acts between one end cap 64 and the lock nut 70 for urging the control rod from its position as seen in FIG. 6 to its position as seen in FIG. 5, thereby compensating for overtravel of the control rod with respect to the slack adjuster after the control rod has locked the slack adjuster.

If an empty and load device, such as shown in our copending patent application Ser. No. 1,266 filed Jan. 7, 1970, for example, is employed and the railway car is loaded, air enters the cylinder 10 and the push rod 14 starts to move. As the push rod moves, the brake shoes 24 and 46, FIG. 1, are pivoted against the wheels. This movement on one end of the railway car moves the slack adjuster 26 into the control rod 50 and the movement on the other end of the car moves the control rod into the slack adjuster. This combination of movement locks the slack adjuster and, in effect, establishes a rigid connection from the air cylinder to the brake shoes. In an exemplary installation, under this situation the push rod 14 will have moved out from the brake cylinder approximately 7 inches and additional movement of the slack adjuster and the control rod would stop. However, when the railway car is empty, and approximately 7 inches of piston push rod travel has occurred, the slack adjuster will lock, but a solid connection does not exist because the empty and load apparatus, as shown in our aforementioned patent application Ser. No. 1,266, is unlocked and the cylinder is working against said apparatus. As the piston push rod continues to move out, the movement of the slack adjuster and the control rod continues even though the slack adjuster is locked, until the piston push rod has moved out its maximum stroke. This extra movement is compensated for by the addition of the overtravel compensating device 56 described hereinbefore, wherein said device moves from its position as seen in FIG. 6 to its position as seen in FIG. 5. Upon release of the brakes, the spring 71 returns the overtravel compensating device from its position as shown in FIG. 5 to its position as shown in FIG. 6.

In the embodiment of the invention shown in FIGS. 7 and 8, the air cylinder 10 carries the piston push rod which is pivotally mounted on one end of the live lever 16. As the cylinder moves out it pushes the live lever. The live lever pulls the center rod 32 which through levers and rods pulls the shoes against the wheels on one end of the car. The slack adjuster 26 is attached at the other end of the live lever 16 and through a series of levers and rods it will pull the other set of shoes against the wheels.

An activator lever 48 is fulcrumed near the cylinder but separates from it, as at 49. A pin 51 in the center rod 32 extends through both the live lever 16 and the activator lever 48 so that, as the center rod is pulled forward, it pushes the activator lever forward and, because the activator lever is fulcrumed on one end, the other end thereof is forced into the slack adjuster. As the live lever 16 tries to pivot about the center pin 51, it pulls the slack adjuster 26 into the control rod 50. The control rod 50 has a yoke 52 at one end which is pivotally connected to the activating lever 48, as at 76. The overtravel compensating device 56 is mounted on the control rod 50, and the activating arm 58 extending from the slack adjuster 26 engages the overtravel compensating device 56 for causing operation of the slack adjusting device, as described hereinbefore in connection with the embodiment of FIGS. 1–6.

It will thus be seen that the present invention does indeed provide an improved braking system which is superior in simplicity and efficiency, as compared to prior art devices.

Although certain particular embodiments of the invention are herein disclosed for purposes of explanation, various modifications thereof after study of this specification will be apparent to those skilled in the art to which the invention pertains.

What is claimed and desired to be secured by Letters Patent is:

1. Braking apparatus comprising an air cylinder, a piston push rod carried by said air cylinder, a live lever pivotally connected to said piston push rod, first linkage means connected to said live lever, a first pair of brake shoes connected to said linkage means, a slack adjuster connected to said live lever, a center rod actuatable by said live lever, a dead fulcrum lever connected to said center rod, second linkage means connected to said dead fulcrum lever, a second pair of brake shoes connected to said second linkage means, a control rod actuatable by said live lever, an overtravel compensating device mounted on the control rod, activating means extending from said slack adjuster for engaging said overtravel compensating device.

2. Braking apparatus according to claim 1 wherein said overtravel compensating device comprises a cylindrical member, a pair of end caps mounted on the ends of said member respectively, said control rod extending through openings in the end caps, a spring retainer fixedly mounted on said control rod within said member, a spring mounted on the control rod for acting between one of said end caps and said spring retainer.

3. Braking apparatus comprising an air cylinder, a piston push rod carried by said air cylinder, a live lever pivotally connected to said piston push rod, linkage means connected to said live lever, brake shoes connected to said linkage means, a slack adjuster connected to said live lever, a control rod actuatable by said live lever, an overtravel compensating device mounted on the control rod, activating means extending from said slack adjuster for engaging said overtravel compensating device, said overtravel compensating device including a cylindrical member, a pair of end caps mounted on the ends of said member respectively, said control rod extending through openings in the end caps, a spring retainer fixedly mounted on said control rod within said member, a spring mounted on the control rod for acting between one of said end caps and said spring retainer.

4. Braking apparatus comprising an air cylinder, a piston push rod carried by said air cylinder, a live lever pivotally connected to said piston push rod, first linkage means connected to said live lever, a first pair of brake shoes connected to said linkage means, a slack adjuster having one end connected to said live lever, a center rod having one end connected to the other end of said slack adjuster, a dead fulcrum lever, the other end of said center rod being connected to said dead fulcrum lever, second linkage means connected to said dead fulcrum lever, a second pair of brake shoes connected to said second linkage means, a control rod actuatable by said live lever, an overtravel compensating device mounted on the control rod, activating means extending from said slack adjuster for engaging said overtravel compensating device, said overtravel compensating device including a cylindrical member, a pair of end caps mounted on the ends of said member respectively, said control rod extending through openings in the end caps, a spring retainer fixedly mounted on said control rod within said member, a spring mounted on the control rod for acting between one of said end caps and said lock spring retainer.

5. Braking apparatus comprising an air cylinder, a piston push rod carried by said air cylinder, a live lever having one end pivotally connected to said piston push rod, a first pull rod having one end connected to the other end of said live lever, first linkage means connected to the other end of said first pull rod, a first pair of brake shoes connected to said linkage means, a slack adjuster having one end connected to a medial portion of said live lever, a center rod having one end connected to the other end of said slack adjuster, a dead fulcrum lever, the other end of said center rod being connected to a medial portion of said dead fulcrum lever, a second pull rod having one end connected to one end of said dead fulcrum lever, second linkage means connected to the other end of said second pull rod, a second pair of brake shoes connected to said second linkage means, an activating lever having one end connected to one end of said live lever, a control rod, a yoke connected to one end of said control rod, said yoke being pivotally mounted on said activating lever, an overtravel compensating device mounted on the control rod, an activating arm extending from said slack adjuster for engaging said overtravel compensating device, said overtravel compensating device including a nipple, a pair of end caps threadably mounted on the ends of said nipple respectively, said control rod having a threaded end portion extending through openings in the end caps, a lock nut mounted on said control rod within said nipple, a spring mounted on the control rod for acting between one of said end caps and said lock nut.

6. Braking apparatus comprising an air cylinder, a piston push rod carried by said air cylinder, a live lever connected to said piston push rod, a center rod having one end pivotally connected to said live lever, a slack adjuster having one end connected to said live lever, first linkage means connected to the other end of said slack adjuster, a first pair of brake shoes connected to said linkage means, an activator lever pivotally connected to said one end of said center rod, a control rod actuatable by said activator lever, an overtravel compensating device mounted on said control rod, activating means extending from said slack adjuster for engaging said overtravel compensating device, a dead fulcrum lever, the other end of said center rod being connected to said dead fulcrum lever, second linkage means being connected to said dead fulcrum lever, a second pair of brake shoes connected to said second linkage means.

7. Braking apparatus according to claim 6 wherein said overtravel compensating device comprises a cylindrical member, a pair of end caps mounted on the ends of said member respectively, said control rod extending through openings in the end caps, a spring retainer fixedly mounted on said control rod within said member, a spring mounted on the control rod for acting between one of said end caps and said spring retainer.

8. Braking apparatus comprising an air cylinder, a piston push rod carried by said air cylinder, a live lever having one end connected to said piston push rod, a center rod having one end pivotally connected to an intermediate portion of said live lever, a slack adjuster having one end connected to the other end of said live lever, a first pull rod having one end connected to the other end of said slack adjuster, first linkage means connected to the other end of said first pull rod, a first pair of brake shoes connected to said linkage means, a control rod, a yoke connected to one end of said control rod, an activator lever pivotally connected to said one end of said center rod, said yoke being pivotally connected to said activator lever, an overtravel compensating device mounted on said control rod, an activating arm extending from said slack adjuster for engaging said overtravel compensating device, said overtravel compensating device including a nipple, a pair of end caps mounted on the ends of said nipple respectively, said control rod having a threaded end portion which extends through openings in the end caps respectively, a lock nut mounted on the control rod within the nipple, a spring mounted on the control rod which acts between one of said end caps and said lock nut, a dead fulcrum lever, the other end of said center rod being connected to a medial portion of said dead fulcrum lever, a second pull rod having one end connected to one end of said dead fulcrum lever, second linkage means being connected to the other end of said second pull rod, a second pair of brake shoes connected to said second linkage means.

* * * * *